(12) United States Patent
van der Merwe

(10) Patent No.: US 6,341,481 B1
(45) Date of Patent: Jan. 29, 2002

US006341481B1

(54) HEADER FOR HARVESTING MACHINE

(75) Inventor: Paul van der Merwe, Postbus (ZA)

(73) Assignee: CLAAS Saulgau GmbH, Saulgau (DE)

( * ) Notice: Subject to any disclaimer, the term of this patent is extended or adjusted under 35 U.S.C. 154(b) by 0 days.

(21) Appl. No.: 09/510,250

(22) Filed: Feb. 22, 2000

Related U.S. Application Data

(63) Continuation of application No. PCT/GB98/02557, filed on Aug. 26, 1998.

(51) Int. Cl.[7] ................................ A01D 45/02

(52) U.S. Cl. ................................ 56/95; 56/110; 56/119

(58) Field of Search ................................ 56/95, 110, 119, 56/80, 85, 64, 94, 73, 84, 126

(56) References Cited

U.S. PATENT DOCUMENTS

| | | | |
|---|---|---|---|
| 1,855,109 A | 4/1932 | Justman | |
| 2,571,865 A | 10/1951 | Greedy et al. | |
| 3,508,387 A | 4/1970 | Wright | |
| 4,429,516 A | 2/1984 | Erickson | |
| 4,435,946 A | 3/1984 | Erickson | |
| 5,913,803 A * | 6/1999 | Moster | 56/95 |

FOREIGN PATENT DOCUMENTS

| | | |
|---|---|---|
| EP | 0 179 930 | 5/1986 |
| FR | 1509506 | 3/1968 |
| ZA | 84/8164 | 10/1984 |
| ZA | 93/3794 | 2/1994 |
| ZA | 95/9635 | 2/1994 |
| ZA | 95/10767 | 12/1995 |

* cited by examiner

*Primary Examiner*—H. Shackelford
(74) *Attorney, Agent, or Firm*—Husch & Eppenberger, LLC; Robert E. Muir

(57) ABSTRACT

A harvesting machine, such as a combine, has a number of laterally equispaced, side by side, rotatable augers (14) extending in a forward direction, each auger having a rotatable auger shaft (16) which is included upwardly towards the rear and an auger flight on the shaft. Inclined troughs (32) are located beneath each auger (14) with the auger flight (18) being rotatable in the trough. Inclined slots (28) are also provided which extend rearwardly from respective slot entrances at the forward end of the header, the slots being sufficiently wide to allow passage of stalks of material to be harvested but too narrow to allow passage of crop ears or other material to be collected so that the crop ears or other material to be collected can be stripped from the stalks by the action of the slots during forward movement of the header. The augers are rotated by a drive. Specific features of the harvesting machine are that the slots are defined between the adjacent troughs and located substantially midway between adjacent auger shafts and the lower portion of an auger flight is rotatable in the lower portion of the trough and an upper part of an auger flight is exposed above the trough. Also disclosed is a method of harvesting using a header of the type described.

23 Claims, 4 Drawing Sheets

HEADER FOR HARVESTING MACHINE

This application is a continuation of PCT Application No. PCT/GB98/02557 filed Aug. 26, 1998 and which named the United States as a designated country.

BACKGROUND TO THE INVENTION

THIS invention relates to a header for a combine harvester.

Typical examples of known combine harvester headers are described in the specifications of South African patents ZA 84/8164, ZA 93/3794, ZA 95/9635 and ZA 95/10767. The headers described in these documents incorporate a series of individual reapers each of which has one or two augers located in a chute the base of which slopes upwardly to the rear and which is defined between upstanding side walls. A slot is formed in the base of the chute, beneath the auger(s), to receive crop stalks as the header moves through the land. The stalks are guided into the slot by forwardly tapered gathering shoes which project in front of the auger (s) on either side of the slot.

Known headers as described in the prior art documents referred to above suffer from a number of disadvantages, including the following:

As a further consequence, the use of a three-reaper configuration limits the harvesting operation to the harvesting of only three rows on each pass. However modern combine harvesters generally have a very large capacity, so that the harvesting of only three rows at a time results in considerable under-utilisation of that capacity. A further, resulting problem arises where the "groups" of rows, i.e. the groups of rows which the farmer can plant using a given planter, may not be uniformly spaced from one another. This further increases the difficulty of correcting harvesting the rows with conventional, fixed row-width headers.

As another example it is considered efficient in the case of irrigated maize to plant at a row spacing of 450 mm. However because there is no currently available header having reapers capable of handling this row spacing farmers will generally plant at a 900 mm row spacing. This row spacing can be handled by existing headers, but only after considerable adjustment and possibly even the addition of extra reapers. Apart from the reduction in land productivity resulting from the excessive row spacing, such adjustment and/or addition is time-consuming and inefficient.

The crop-receiving slots of the known headers are located substantially directly beneath the auger(s). Thus the stalks which enter the slots are positively engaged and pulled along the slots by the auger(s). For a given auger rotational speed, excessive ground speed of the combine harvester means that the auger(s) cannot pull the stalks along the slots fast enough, with the result that the stalks can be pushed over and damaged. If, on the other hand, the ground speed is less than it should be for a given auger rotational speed, the auger(s) will pull the stalks too fast along the slots, possibly ripping them out of the ground and damaging them. The known headers are accordingly speed-dependent.

The known headers are generally inefficient because a substantial quantity of trash material, for instance broken pieces of stalk, leaves and so forth, is fed into the threshing section of the combine harvester along with the crop ears. This in turn places a heavier burden on the combine harvester, resulting in increased fuel consumption and accelerated wear and tear than would be the case if the header were better able to separate trash from the ears.

The forwardly tapered gathering shoes of the known headers are frequently unable to get beneath and lift up crop material which has fallen down or been flattened and is lying prone in the field. This means that this material is not processed by the header and is accordingly wasted.

SUMMARY OF THE INVENTION

According to a first aspect of the invention there is provided a header for a harvesting machine, especially a combine harvester, comprising:

- a plurality of laterally equispaced, side by side, rotatable augers extending in a forward direction, each auger having a rotatable auger shaft which is included upwardly towards the rear and an auger flight on the shaft,
- correspondingly inclined troughs located beneath each auger with the auger flight being rotatable in the trough,
- correspondingly inclined slots extending rearwardly from respective slot entrances at the forward end of the header, the slots being sufficiently wide to allow passage of stalks of material to be harvested but too narrow to allow passage of crop ears or other material to be collected so that the crop ears or other material to be collected can be stripped from the stalks by the action of the slot during forward movement of the header,
- drive means for rotating the augers,
- whereby
  - the slots are defined between the adjacent troughs and located substantially midway between adjacent auger shafts, and
  - the lower portion of an auger flight is rotatable in the lower portion of the trough and an upper part of an auger flight is exposed above the trough.

According to a second aspect of the invention there is provided a header for a harvesting machine, especially a combine harvester, comprising:

- a plurality of laterally equispaced, side by side, rotatable augers extending in a forward direction, each auger having a rotatable auger shaft which is inclined upwardly towards the rear and an auger flight on the shaft,
- correspondingly inclined troughs located beneath each auger with the auger flight being rotatable in the trough,
- correspondingly inclined slots extending rearwardly from respective slot entrances at the forward end of the header, the slots being sufficiently wide to allow passage of stalks of material to be harvested but too narrow to allow passage of crop ears or other material to be collected so that the crop ears or other material to be collected can be stripped from the stalks by the action of the slots during forward movement of the header,
- drive means for rotating the augers wherein the measures of the augers, troughs and other elements of the header are chosen in a way that the distance between two slots is 50 cm as a maximum.

Conventionally, the distance between two slots is approximately 30 cm.

Preferably, there is no transverse overlap between auger flights of adjacent augers.

A transverse gap is typically provided between the auger flights of adjacent augers.

Slots are usually defined between inclined side edges of the troughs which are at the same or a lower elevation than the auger shafts. These slots are typically at a higher elevation than the bases of the troughs.

Typically, the maximum transverse dimension of an auger flight is slightly greater than the width of a trough, whereby the auger flight extends a small distance over the slots on either side.

Preferably, the plurality of augers defines a substantially inclined separation and transportation zone for the crop to be harvested.

The augers may be positioned sufficiently close together to convey relatively light and elongate trash material sideways at a relatively high level on top of the augers while the stripped crop ears are conveyed rearwardly in the troughs at a relatively low level.

Preferably, there is no separating wall between adjacent augers and no cover plates covering augers or gaps between augers either fully or partially.

The augers usually extend to auger tips defining the foremost end of the header, and auger flights extend to the auger tips.

According to a third aspect of the invention there is provided a method of harvesting crop ears from a standing stalk crop using a header which comprises a plurality of side by side, inclined, rotatable augers located above correspondingly inclined troughs which define correspondingly inclined slots between them, the method comprising the steps of:

moving the header in a forward direction through the standing stalk crop so that stalks of the crop are received in the slots, whereby crop ears can be stripped from the stalks by the action of the slots to fall into the troughs, and rotating the augers to convey the stripped crop ears rearwardly in the troughs at a relatively low level and to convey relatively elongate and light trash material sideways on top of the augers.

Typically, the method includes the step of making use of a header comprising more slots per working width of the header than rows of stalk crop to be harvested from a corresponding width.

According to a fourth aspect of the invention there is provided a header for a combine harvester comprising:

a plurality of laterally equispaced troughs inclined upwardly in a rearward direction, a first group of correspondingly inclined augers each located over a trough and having an auger shaft supporting a spiral auger flight, upper portions of the flights of the augers in the first group being exposed above the troughs for cooperation with one another, a second group of correspondingly inclined augers located alongside the the first group of augers, each auger in the second group being located over a trough and having an auger shaft supporting a spiral auger flight of opposite hand to the auger flights of the augers in the first group, upper portions of the flights of the augers in the second group being exposed above the troughs for cooperation with one another, means for rotating the first and second groups of augers in opposite rotational directions, and correspondingly inclined slots defined between the upper edges of adjacent troughs, the slots being located midway between adjacent auger shafts at a level above the bases of the troughs, the slots extending rearwardly from respective slot entrances at the forward end of the header, such that when the header moves forwardly through a land planted with a stalk crop carrying crop ears which are to be processed by the combine harvester, the stalks of the crop enter the slots through the slot entrances and move rearwardly along the slots, the slots being sufficiently wide to allow passage of the stalks but too narrow to allow passage of the crop ears, whereby passage of the stalks through the slots causes crop ears to be stripped from the stalks to fall into the troughs to be conveyed rearwardly therein by the augers.

BRIEF DESCRIPTION OF THE DRAWINGS

The invention will now be described in more detail, by way of example only, with reference to the accompanying drawings in which.

DESCRIPTION OF PREFERRED EMBODIMENTS

Figure 1:
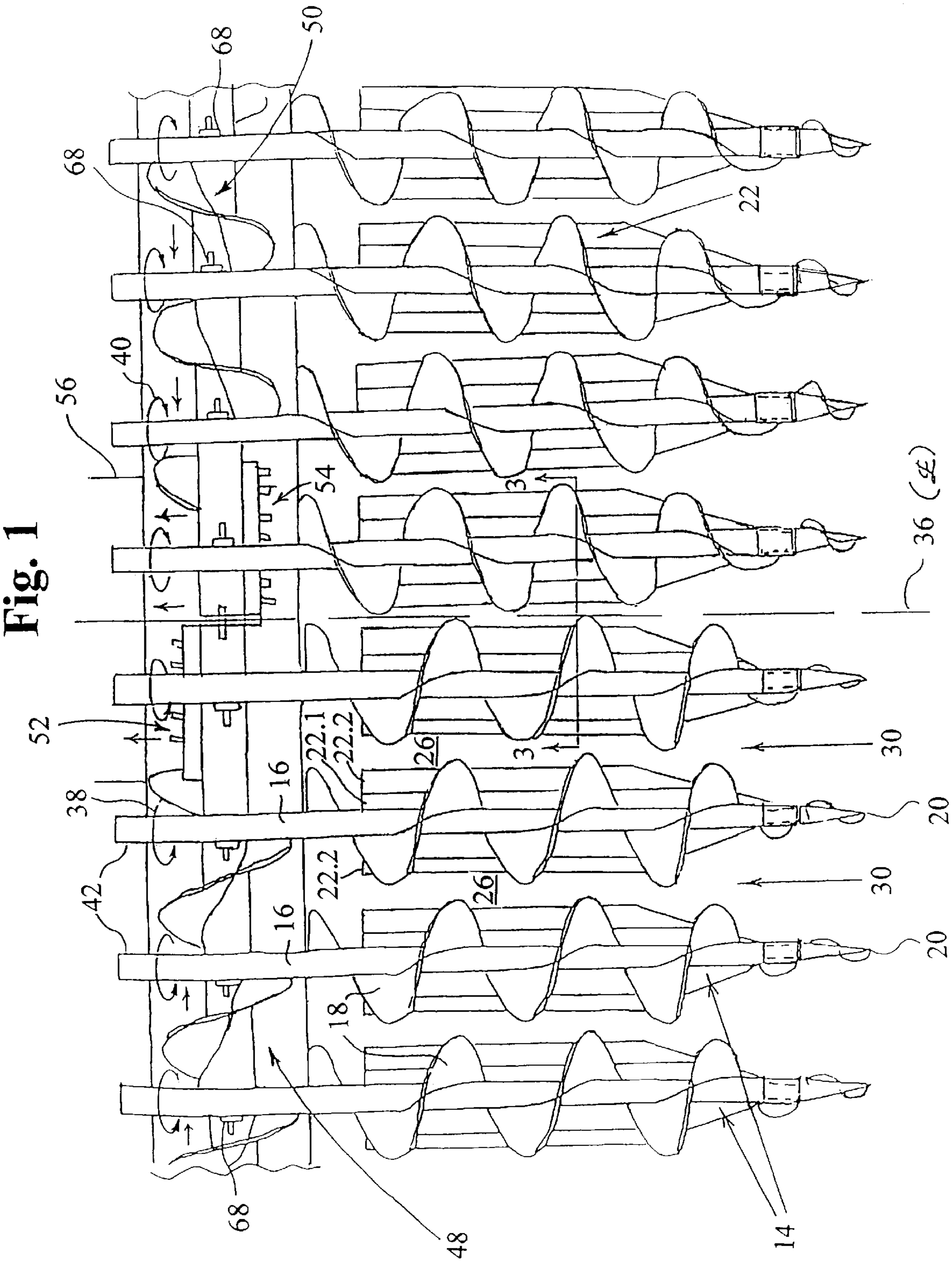
FIG. 1 shows a diagrammatic plan view of part of a central region of a header for a combine harvester according to the invention.
Figure 2:
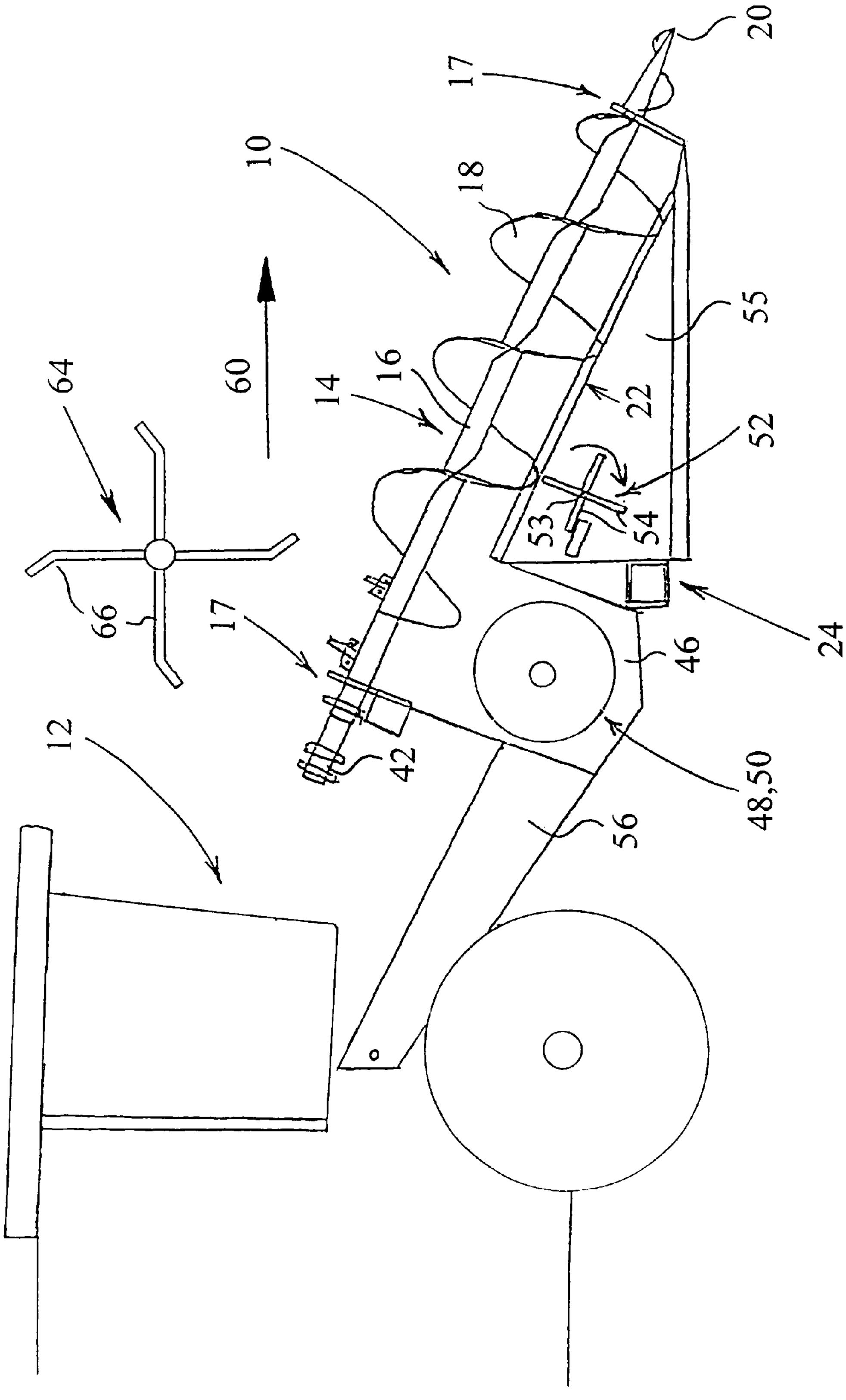
FIG. 2 shows a cross-sectional view of the header taken at a vertical fore-and-aft plane.

FIG. 1 shows a central portion of a header 10 for a combine harvester 12 seen partially in FIG. 2. The header 10 includes a great number of parallel augers 14 which are equally laterally spaced from one another. Each auger has a rotatable shaft 16 supporting a flight 18. The shafts 16 are supported at the front and rear by bearing structures 17 (FIG. 2). The auger flights extend to the leading tips 20 of the augers and undergo a progressive reduction in transverse dimension in a front end region of each auger close to the associated tip. It will be noted that the flights are exposed at the auger tips and that there are no forwardly extending shoes as is the case in conventional headers.

Figure 6:
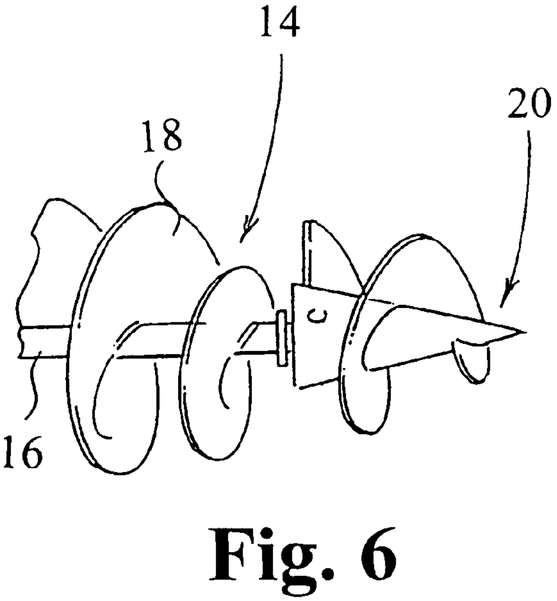
FIG. 6 shows a detail of a modified auger tip.

Whereas FIGS. 1 and 2 show auger tips which are tapered extensions of the shafts 16, FIG. 6 shows an alternative arrangement in which each auger tip is a separate conical element, mounted at the end of the corresponding shaft, and carrying a separate, short auger flight which cooperates with the main auger flight on the shaft.

Figure 3:
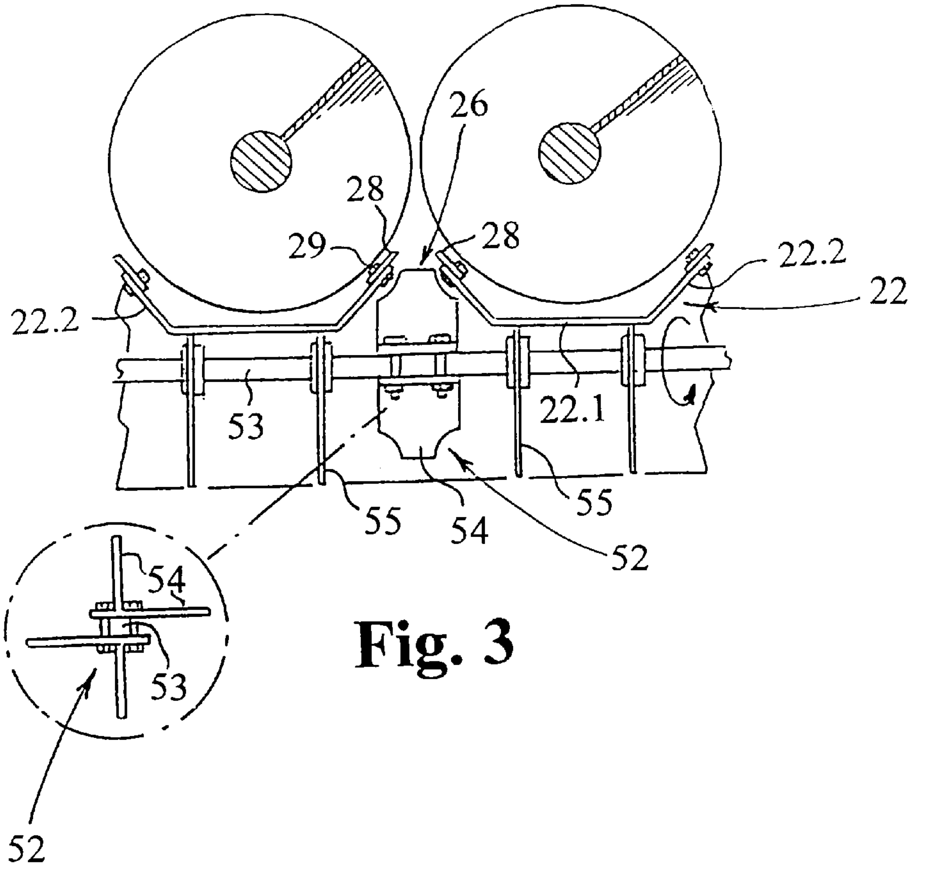
FIG. 3 shows a cross-section at the line 3—3 in FIG. 1.

The header 10 also includes a series of individual troughs 22 each of which is located beneath an auger 14. Referring to FIGS. 2 and 3 in particular, it will be seen that each trough 22 includes a base wall 22.1 and upwardly and outwardly inclined side walls 22.2. It will also be seen that the troughs are inclined upwardly towards the rear. The troughs 22, which support the front auger shaft bearings 17 at their forward ends, extend forwardly from and are supported at the rear by a transverse rear frame indicated generally by the numeral 24.

Slots 26 extending in the fore and aft direction are formed between the upper edges of the side walls 22.2 of the adjacent troughs 22. The slots 26 are located substantially midway between the adjacent auger shafts 16 and are of adjustable width by virtue of adjustment plates 28 bolted by bolts 29 through slots to the side walls 22.2 of the troughs 22. By means of the plates 28 the slots 26 are adjusted, in the case of maize harvesting, to be wide enough to allow passage of a maize stalk but too narrow to allow passage of a maize ear or cob. The slots have rearwardly tapering slot entrances 30, defined by forwardly tapering leading end portions of the troughs 22, at their forward ends to facilitate entry of maize stalks into the slots during operation of the header, as described in more detail below.

In general at least two slots 26 are provided in each one meter working width of the header. That is to say that the distance between two slots should be equal to or less than 50 cm. The applicant has found that a suitable slot spacing is 30 cm. This allows the header to harvest row independently as the spacing between rows of crop stalks is generally more than 30 cm resulting in the header having more slots over a working width than rows of crops to be harvested over the same width. The advantage of the header being able to harvest row independently is described in more detail later in this specification.

The upper edges of the troughs, defined by the side walls 22.2 and adjustment plates 28, are at a lower level than the axes of the auger shafts 16. With this feature it is possible for the lateral extremities of the auger flights 18 to extend laterally a short distance beyond the troughs 22 and over the slots 26 as shown in FIGS. 1 and 3. It will however be seen in these Figures that the auger flights 18 of adjacent augers do not overlap one another and that there is in fact a small transverse gap between the flights of the adjacent augers. The importance of this is described below. It will also be seen that the troughs are generally complemental to the auger flights with only a relatively small clearance between the flights and the walls 22.1, 22.2.

In FIG. 1, the fore-and-aft center line of the header 10 is indicated with the numeral 36. To the left of the center line, as viewed in FIG. 1, all the augers 14 are rotated in the direction of the arrows 38. To the right of the center line, as viewed in FIG. 1, all the augers are rotated in the opposite sense, as indicated by the arrows 40. As will also be clear from FIG. 1, the flights 18 are of opposite hand on opposite sides of the center line 36.

In each case, the augers are rotated by suitable drives applied to the rear ends 42 of the auger shafts 16. The drives may, for instance, comprise cogs on the auger shafts and motor driven chains (not shown) engaging the cogs. Alternatively, the shafts may be driven by individual gear-boxes linked to one another by flexible couplings. The drives are powered by the combine harvester 12.

Towards the rear of the header 10 there is a transverse cavity or channel 46 which extends for the full width of the header. To the left of the center line 36, as viewed in FIG. 1, the cavity accommodates a horizontally oriented auger 48. To the right of the center line the cavity accommodates a similar, horizontally oriented auger 50. The augers 48 and 50 are aligned with one another but are of opposite hand. In operation of the header, they are rotated in the same rotary direction by suitable drives (not shown). Towards their adjacent ends, the shafts of the augers 48 and 50 can carry brushes 52, 54 which sweep against the bottom and sides of the cavity 46 as the augers rotate.

On the center line 36 the cavity 46 is intersected by a chute 56 which forms part of the combine harvester itself and which accommodates a conveyor (not shown). The chute 56 of the combine harvester and the conveyor which it accommodates are inclined upwardly and to the rear. As is conventional the chute 56 discharges at its rear end into the threshing section of the harvester 12.

Beneath the slots 26, towards the rear ends thereof, rotors 52 are mounted fast on shafts 53 which pass through plates 55 extending downwardly from the base walls 22.1 of the troughs 22. The rotors 52 have blades 54 which are aligned with the slots and which are shaped as shown in FIG. 3. The shafts 53 are driven in rotation by chain or other suitable drives (not shown).

In use, with the header 10 mounted to the combine harvester such that the chute 56 communicates with the cavity 46 and the augers and rotors rotating, the header is driven forwardly, in the direction of the arrow 60, into a field of a stalk crop planted in rows. The stalk crop is typically maize, but although the illustrated embodiment is described in this context, it will be understood that the principles of the header are applicable to other stalk crops as well. Movement of the header will generally be in a direction parallel to the rows. Given the fact that the header is of considerable width, with a large number of augers, numerous crop rows will be covered by the header in a single pass. Irrespective of the distance between adjacent rows or the uniformity of row spacing, all stalks within the region covered by the header will be taken into one or other of the slot entrances 30 and hence will be guided into the associated slot 26.

As the stalks move rearwardly in the slots the elevation of the troughs 22, and hence of the slots, increases. The maize ears and any other material which is situated low down on the maize stalks and cannot pass through the slots is stripped off the stalks, which remain engaged with the ground.

When the stalks reach the rotors 52 they are pushed down by the blades 54 with the result that higher maize ears and other material are also stripped off the stalks. In many cases, the maize stalks are severed by the blades with the result that only the separated lower parts of the stalks remain standing in the land after passage of the combine harvester.

The maize ears, together with other heavier trash components which are stripped from the stalks, fall into the troughs 22, are conveyed rearwardly by the rotating augers 14 and fall into the cavity 46. In the cavity 46, these components are conveyed inwardly towards the center of the header by the transverse augers 48, 50. They are then withdrawn from the central region of the cavity 46 and are transported to the threshing section of the combine harvester by the conveyor in the chute 56. The brushes 52 and 54 assist in sweeping the ears into the chute 56 of the combine harvester.

Since essentially only the ears and other smaller and heavier crop components which fall into the troughs 22 are taken to the cavity 46 and eventually to the thresher of the combine harvester, only a relatively small amount of trash finds its way into the threshing section. The thresher of the combine harvester is accordingly only required to deal with a limited amount of trash material.

Upper portions of the stalks and elongate leaves which are separated by the action of the slots and the rotors, and which do not fall through the slots 26, fall on top of the augers 14. The augers are close enough to one another to ensure that the majority of the elongate and lighter trash material collects in this way. The auger flights 18 align the elongate material generally in a transverse direction and move it to the rear where it is supported by the unflighted rear end portions of the auger shafts 16. The direction of rotation of the augers is such that the material supported thereon is conveyed sideways towards the sides of the header.

Figure 4:
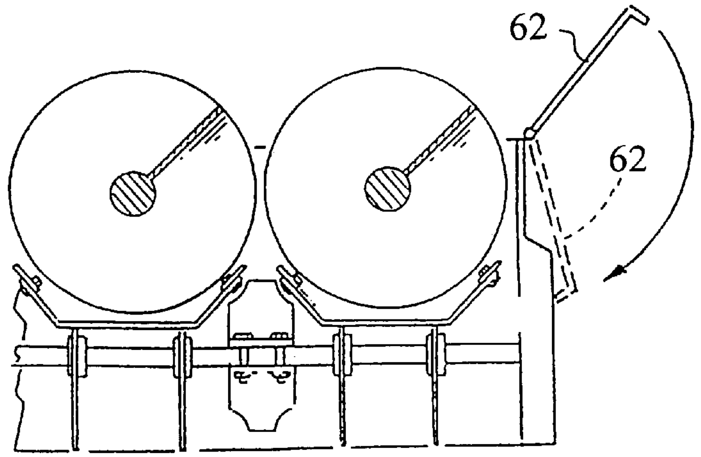
FIG. 4 shows a vertical cross-sectional view of an end region of the header.
Figure 5:
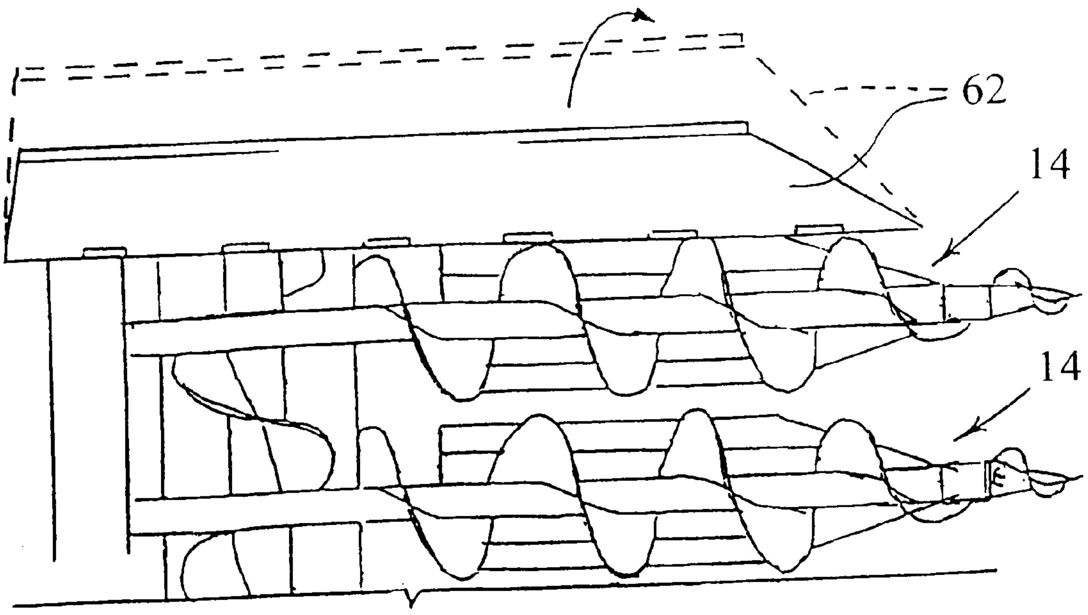
FIG. 5 shows a plan view of the end region seen in FIG. 4.

Referring to FIGS. 4 and 5 of the drawings it will be seen that the header includes pivotable side walls 62 adjacent the outermost augers 14. In normal usage, the side walls 62 are generally upright as shown in full lines in FIG. 4. The trash material which is conveyed sideways by the action of the rotating augers 14 accordingly accumulates against the side walls 62 and is eventually discharged sideways over the side walls to fall onto the land.

The auger shafts 16 are provided with transverse teeth 68 which are arranged to engage the trash material on the augers and to assist in moving that material in the sideways direction. It is possible that crop heads may remain attached in some cases to upper sections of the stalks which are severed from the lower stalk sections by the action of the rotor 52. In such cases, crop heads may also be transported sideways for eventual discharge over the side walls 62 onto the land. To reduce the risk of heads being lost in this way, the teeth 68 can be detached from the auger shafts to reduce the force with which the trash material is moved sideways. As another measure to reduce the chances of maize heads being discharged sideways from the header, it is possible to counter-rotate the outermost auger 14 on each side relative to the other augers on that side, thereby to apply a restraint to sideways discharge of material.

If, during operation, there is an excessive accumulation of trash material on the augers, to the extent that the accumulated material forms a barrier to the movement and discharge of further trash material, it is possible to pivot the side walls 62 down to allow the trash material to discharge sideways and fall onto the land more rapidly. Additionally trash material which has accumulated on the augers can be swept rearwardly off the header by the action of a rotor 64 seen in FIG. 2. The rotor has a series of arms 66 arranged to engage the uppermost trash material and sweep it rearwardly off the header 10.

It will accordingly be understood that the header operates to perform a general separation between the ears and other heavier and smaller trash components, which are conveyed rearwardly at a relatively low level in the troughs, and the elongate, lighter trash components which are conveyed sideways at a relatively high level on the augers 14. This is seen to be an important advantage of the invention in that as a result of the separation which is achieved only a relatively small amount of trash material finds its way into the thresher.

It will be understood that the sideways movement of the elongate trash components is made possible inter alia as a result of two factors:

1. The side walls 22.2 of the troughs 22 are relatively low so that the auger shafts and auger flights are exposed above the troughs, allowing them to cooperate with one another to support the trash material and convey it sideways. This would not be possible with a conventional header in which augers or auger pairs are located in deep chutes or passages which have high side walls extending to the forward gathering shoes.
2. The augers 14 are close enough to one another to provide support for the trash material. Although some trash material will be able to fall between adjacent augers and possibly into the troughs or through the slots, the major part of the elongate and lighter trash material will be conveyed sideways by the augers.

As shown in FIG. 1, a plurality of the augers 14 define a separation and transportation zone for the crop to be harvested. In this zone, the augers 14 separate the elongate, lighter trash components from the crop, and the augers 14 transport the crop rearwardly to cavity 46. The augers 14 also transport the elongate, lighter trash material sideways.

Another major advantage of the header 10 is the fact that it is row and speed independent. As regards row independence, the standing crop stalks will be received by one or other of the slots 26 irrespective of the row spacing in each group of planted rows or the spacing between adjacent groups of planted rows. Thus the header 10 can operate successfully with virtually any conventional row spacing which might arise from the planting habits of the farmer or the planting equipment which he uses. This advantage can be attributed to the fact that there is a large number of cooperating augers rather than a conventional arrangement in which augers or auger pairs are mounted in independent chute structures which have to be correctly spaced apart from one another to suit particular row spacings.

At the edges of a land, where conventional combine harvester headers are unable to harvest because of turning problems, as mentioned above, a header according to the invention can still be used. It is, for instance, possible to drive the header in a direction transverse to the rows across the edge of the planted land thereby to harvest crop in the headland area to provide adequate turning space for the combine harvester when it performs subsequent passes in the row direction. This is made possible because the header is row-independent. Along a row there may be little if any uniformity in the distance between adjacent stalks, but the versatility of the header 10 to take in variable stalk spacings enables it to operate in the transverse direction.

As regards speed independence, it has been said above that the auger flights do not overlap one another in a transverse sense and that there is in fact a gap between them. As a result stalks which enter and move in the slots as the combine harvester moves forwardly through the land may be deflected from side to side by the tips of the auger flights as they move past the stalks, but they are not gripped aggressively by the augers and pulled into the header as in conventional header designs in which the stalk-receiving slots are directly beneath the auger(s). Thus the operation of the header is not dependent on the speed at which the combine harvester moves through the land.

A prototype header built by the inventor had a total of twenty-six augers, and was found to operate very well in practice.

Another advantage of the illustrated header 10 is the fact that the augers. 14 extend to points and do not have gathering shoes. This enables the flighted auger tips to get beneath and lift stalks which may have been flattened, for instance as a result of storm damage, and enables the ears of such stalks to be recovered. This avoids the conventional necessity for persons to walk behind the combine harvester to pick up flattened stalks which the conventional auger gathering shoes cannot lift.

The augers 14 may rotate in directions opposite to those illustrated with the result that lighter, elongate trash material will tend to accumulate towards the center of the header rather than the sides, with suitable trash removal means then being provided to remove the trash from the middle of the header.

Referring to FIG. 1, it will be seen that the flights of the augers to the right side of the center line 36 are in phase with one another and 180E out of phase with the flights 18 on the augers to the left side of the center line. With this feature, the situation does not arise during rotation of the augers that the flights on two adjacent augers form a narrow nip between them in which a maize head could be aggressively gripped and perhaps damaged before it is stripped from the stalk and recovered for threshing. Also, with this feature, the stalks are able to progress along the slot in an orderly manner without being gripped aggressively by the auger flights.

What is claimed is:

1. A header for a harvesting machine having a front and a rear and comprising:

a plurality of laterally equispaced, side by side, rotatable augers extending forwardly at the front of the machine, each auger having a rotatable auger shaft which is included upwardly toward the rear, and an auger flight on the shaft, correspondingly inclined troughs located beneath each auger, each auger flight being rotatable in its corresponding trough, with a gap between nonoverlapping flights of the laterally equispaced, side by side, rotatable augers, where the laterally equispaced, side by side rotatable augers operate in a cooperating relationship without being mounted in independent chute structures to convey a portion of elongate trash material sideways on top of the laterally equispaced, side by side rotatable augers, correspondingly inclined slots extending rearwardly from respective slot entrances at the forward end of the header, the slots being sufficiently wide to allow passage of stalks of material to be harvested but too narrow to allow passage of crop ears or other material to be collected so that the crop ears or other material to be collected can be stripped from the stalks by the action of the slots in combination with a plurality of rotors, so that the rotors arc operative for both picking and conveying during forward movement of the header, and drive means for rotating the laterally equispaced, side by side rotatable augers, whereby the slots are defined between the adjacent troughs of the laterally equispaced, side by side rotatable augers and located substantially midway between adjacent auger shafts, and the lower portion of an auger flight, taken transversely, is rotatable in the lower portion of the trough and an upper part of the auger flight, taken transversely, is exposed above the trough.

2. A header for a harvesting machine having a front and a rear and comprising:

a plurality of laterally equispaced, side by side, rotatable augers extending forwardly at the front of the machine, each auger having a rotatable auger shaft which is included upwardly toward the rear, and an auger flight on the shaft, correspondingly inclined troughs located beneath each auger, each auger flight being rotatable in its corresponding trough, with a gap between nonoverlapping flights of the laterally equispaced, side by side, rotatable augers, where the laterally equispaced, side by side rotatable augers operate in a cooperating relationship without being mounted in independent chute structures to convey a portion of elongate trash material sideways on top of the laterally equispaced, side by side rotatable augers, correspondingly inclined slots between adjacent augers which correspond to the gaps extending rearwardly from respective slot entrances at the forward end of the header, the slots being sufficiently wide to allow passage of stalks of material to be harvested but too narrow to allow passage of crop ears or other material to be collected so that the crop ears or other material to be collected can be stripped from the stalks by the action of the slots in combination with a plurality of rotors, so that the rotors are operative for both picking and conveying during forward movement of the header, and drive means for rotating the laterally equispaced, side by side rotatable augers, the laterally equispaced, side by side rotatable augers and troughs being constructed and arranged so that the distance between two slots is 50 cm as a maximum.

3. A header according to claim 2 wherein the distance between two slots is approximately 30 cm.

4. A header according to claim 1, wherein there is no transverse overlap between auger flights of adjacent augers.

5. A header according to claim 4 wherein there is a transverse gap between the auger flights of adjacent augers.

6. A header according to claim 1, wherein the slots are defined between inclined side edges of the troughs which are at the same or a lower elevation than the auger shafts.

7. A header according to claim 6 wherein the slots are at a higher elevation than the bases of the troughs.

8. A header for a harvesting machine having a front and a rear and comprising:

a plurality of laterally equispaced, side by side, rotatable augers extending forwardly at the front of the machine, each auger having a rotatable auger shaft which is included upwardly toward the rear, and an auger flight on the shaft, drive means for rotating the augers, correspondingly inclined troughs located beneath each auger, each auger flight being rotatable in its corresponding trough, correspondingly inclined slots extending rearwardly from respective slot entrances at the forward end of the header, the slots being sufficiently wide to allow passage of stalks of material to be harvested but too narrow to allow passage of crop ears or other material to be collected so that the crop ears or other material to be collected can be stripped from the stalks by the action of the slots in combination with a plurality of rotors, so that the rotors are operative for both picking and conveying during forward movement of the header, wherein the slots are defined between inclined side edges of the troughs which are the same or a lower elevation than the auger shafts, and wherein the maximum transverse dimension of an auger flight is slightly greater than the width of a trough, whereby the auger flight extends a small distance over the slots on either side, and the lower portion of an auger flight, taken transversely, is rotatable in the lower portion of the trough and an upper part of an auger flight is exposed above the trough.

9. A header according to claim 1, wherein the plurality of augers defines a separation and transportation zone for the crop to be harvested.

10. A header according to claim 1, wherein the augers are sufficiently close together to convey light and elongate trash material sideways at a relatively high level, in comparison to the auger shafts, on top of the augers while the stripped crop ears are conveyed rearwardly in the troughs at a relatively low level in comparison to the auger shafts.

11. A header according to claim 1, wherein there is no separating wall between adjacent augers.

12. A header according to claim 1, wherein there are no cover plates covering augers or gaps between augers either fully or partially.

13. A header according to claim 1, wherein the harvesting machine is a combine harvester.

14. A header according to claim 1, wherein the augers extend to auger tips defining the foremost end of the header, and auger flights extend to the auger tips.

15. A method of harvesting crop ears from a standing stalk crop using a header which comprises a plurality of side by side, inclined, rotatable augers located above correspondingly inclined troughs which define correspondingly inclined slots between them, with a gap between nonoverlapping flights of the laterally equispaced, side by side, rotatable augers, having shafts, where the laterally equispaced, side by side rotatable augers operate in a cooperating relationship without being mounted in independent chute structures to convey a portion of elongate trash material sideways on top of the laterally equispaced, side by side rotatable augers, the method comprising the steps of:

moving the header in a forward direction through the standing stalk crop so that stalks of the crop are received in the slots, whereby crop ears can be stripped from the stalks by the action of the slots in combination with a plurality of rotors, so that the rotors are operative for both picking and conveying, causing the crop ears to fall into the troughs, and rotating the laterally equispaced, side by side rotatable augers to convey the stripped crop leans rearwardly in the troughs at a relatively low level in comparison to the laterally equispaced, side by side rotatable auger shafts.

16. A method according to claim 15 wherein the method includes the step of making use of a header comprising more slots per working width of the header than rows of stalk crop to be harvested from a corresponding width.

17. A header for a combine harvester comprising:

a plurality of laterally equispaced troughs inclined upwardly in a rearward direction, a first group of correspondingly inclined, laterally equispaced, side by side, rotatable augers each located within each one of said troughs and having an auger shaft supporting a spiral auger flight, upper portions of the flights, taken transversely, of the inclined, laterally equispaced, side by side, rotatable augers in the first group being exposed above the troughs for cooperation with one another, with a gap between nonoverlapping flights of the inclined, laterally equispaced, side by side, rotatable augers, where the inclined, laterally equispaced, side by side rotatable augers operate in a cooperating relationship without being mounted in independent chute structures to convey a portion of elongate trash material sideways on top of the inclined, laterally equispaced, side by side rotatable augers, a second group of correspondingly inclined, laterally equispaced, side by side, rotatable augers located alongside the first group of inclined, laterally equispaced, side by side, rotatable augers, each auger in the second group being located within each one of said troughs and having an auger shaft supporting a spiral auger flight of opposite hand to the auger flights of the augers in the first group, upper portions of the flights, taken transversely, of the augers in the second group being exposed above the troughs for cooperation with one another, with a gap between each of the spiral auger flights of the second group of correspondingly inclined augers, where the second group of laterally equispaced, side by side rotatable augers operate in a cooperating relationship without being mounted in independent chute structures to convey a portion of elongate trash material sideways on top of the second group of laterally equispaced, side by side rotatable augers, means for rotating the first and second groups of inclined, laterally equispaced, side by side rotatable augers in opposite rotational directions, and correspondingly inclined slots defined between the upper edges of adjacent troughs, the slots being located midway between adjacent auger shafts at a level above the bases of the troughs, the slots extending rearwardly from respective slot entrances at the forward end of the header, such that when the header moves forwardly through a land planted with a stalk crop carrying crop ears which are to be processed by the combine harvester, the stalks of the crop enter the slots through the slot entrances and move rearwardly along the slots, the slots being sufficiently wide to allow passage of the stalks but too narrow to allow passage of the crop cars, a plurality of rotors that push down on the stalks, whereby passage of the stalks through the slots and in combination with the rotors causes the crop ears to be stripped from the stalks, directed into the troughs, and conveyed rearwardly therein by the inclined, laterally equispaced, side by side rotatable augers.

18. A header according to claim 17, wherein the augers are sufficiently close together to convey light and elongate trash material sideways at a relatively high level, in comparison to the auger shafts, on top of the augers while the stripped crop ears are conveyed rearwardly in the troughs at a relatively low level in comparison to the auger shafts.

19. A header according to claim 17, wherein there is no overlap between auger flights of adjacent augers with the result the stalks are not pulled along the slots by the auger flights.

20. A header according to claim 19 wherein there is a gap between the auger flights of adjacent augers.

21. A header according to claim 17, wherein the slots are defined between inclined side edges of the troughs which are at the same or a lower elevation than the auger shafts.

22. A header according to claim 20, wherein the maximum transverse dimension of each auger flight exceeds the width of the associated trough, whereby the auger flight extends a small distance over the slots on either side of the trough.

23. A header according to claim 17, wherein the augers extend to auger tips defining the foremost end of the header, and auger flights extend to the auger tips.

* * * * *

UNITED STATES PATENT AND TRADEMARK OFFICE

CERTIFICATE OF CORRECTION

PATENT NO. : 6,341,481 B1
DATED : January 29, 2002
INVENTOR(S) : Paul van der Merwe It is certified that error appears in the above-identified patent and that said Letters Patent is hereby corrected as shown below:

Title page,
Item [63], following "Continuation of application No. PCT/GB98/02557, filed on Aug. 26, 1998." insert:
-- [30] Foreign Application Priority Data
August 26, 1997 (ZA).............97/7658 --

Signed and Sealed this

Fifth Day of August, 2003

JAMES E. ROGAN
*Director of the United States Patent and Trademark Office*